United States Patent
Schroeder et al.

(10) Patent No.: US 11,242,139 B2
(45) Date of Patent: Feb. 8, 2022

(54) SPINDLE TO PRIMARY DUCT STATOR ATTACHMENT

(71) Applicant: Bell Textron Inc., Fort Worth, TX (US)

(72) Inventors: Karl Schroeder, Southlake, TX (US); Joseph Richard Carpenter, Jr., Kennedale, TX (US); Brett Zimmerman, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 78 days.

(21) Appl. No.: 16/732,076

(22) Filed: Dec. 31, 2019

(65) Prior Publication Data

US 2021/0197955 A1    Jul. 1, 2021

(51) Int. Cl.
*B64C 27/20* (2006.01)
*B64C 11/00* (2006.01)
*B64C 27/28* (2006.01)
*B64C 27/52* (2006.01)

(52) U.S. Cl.
CPC ............ *B64C 27/20* (2013.01); *B64C 11/001* (2013.01); *B64C 27/28* (2013.01); *B64C 27/52* (2013.01)

(58) Field of Classification Search
CPC ....... B64C 11/001; B64C 27/28; B64C 27/22; B64C 27/20; B64C 27/52
See application file for complete search history.

(56) References Cited

FOREIGN PATENT DOCUMENTS

EP    2551193 A1 *    1/2013    ......... B64C 29/0033

* cited by examiner

*Primary Examiner* — Richard A Edgar
(74) *Attorney, Agent, or Firm* — Lightfoot & Alford PLLC (57) ABSTRACT

A ducted-rotor aircraft includes a fuselage, one or more ducts, and a spindle that rotatably couples the one or more ducts to the fuselage. Each duct includes a hub that is configured to support a rotor, a plurality of stators that are coupled to the hub, a duct ring that is coupled to the plurality of stators, and a fitting that is coupled to a first stator of the plurality of stators. The fitting has a tubular collar that defines a first aperture that extends through the fitting. The collar is configured to receive a portion of the spindle. The first stator includes a rib that is spaced inward from the fitting and that defines a second aperture that is aligned with the first aperture and that is configured to receive an end of the spindle.

20 Claims, 10 Drawing Sheets

SPINDLE TO PRIMARY DUCT STATOR ATTACHMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor typically has internal structure that supports a motor of the aircraft and an aerodynamic exterior skin.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

It is desirable to minimize the number of separate components that make up the structure of a ducted-rotor aircraft, not only to limit the weight of the aircraft, but further to limit the number of joints that might be stressed during operation of the aircraft. Structural components are disclosed herein for use in aircraft such as ducted-rotor aircraft.

Figure 1:
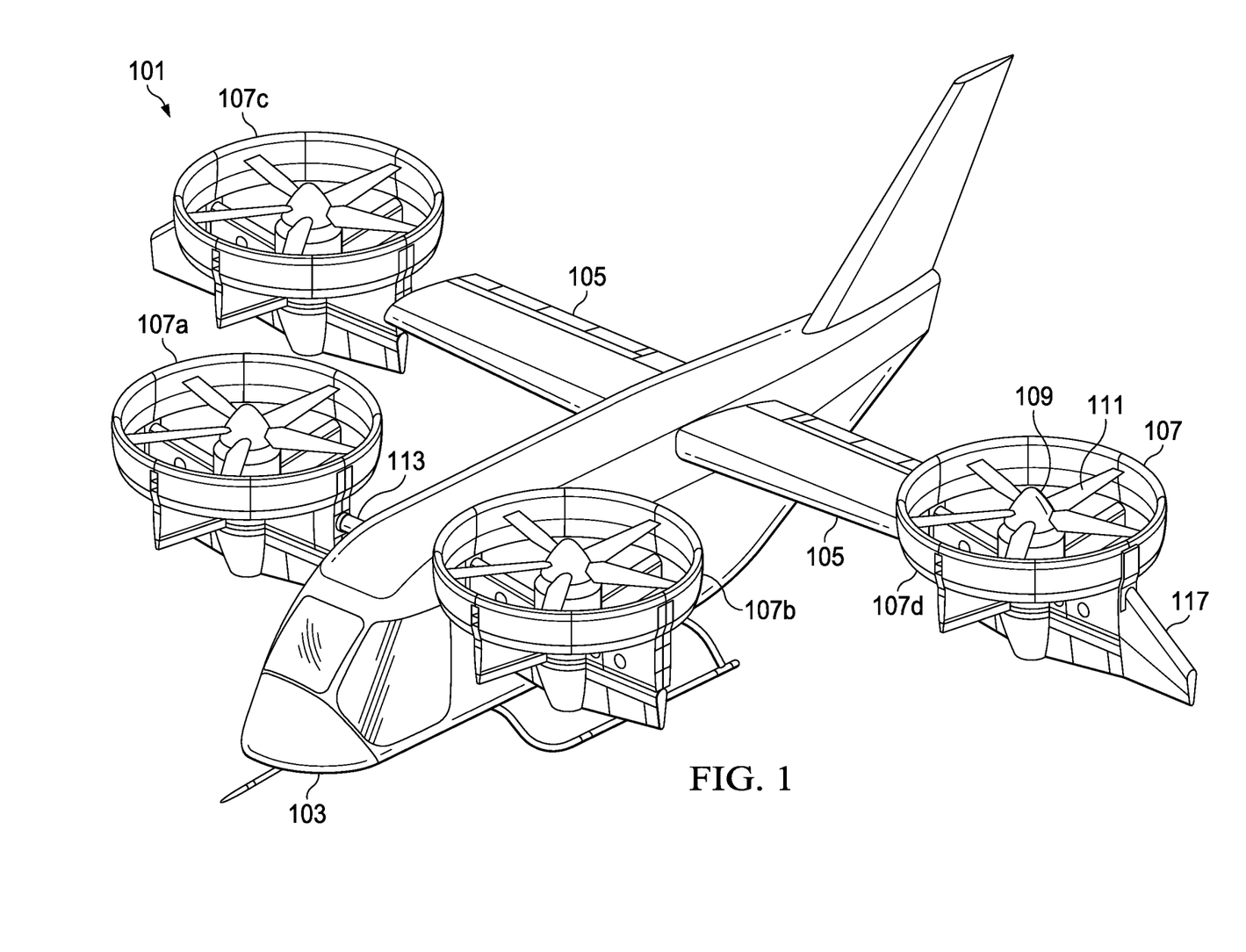
FIG. 1 is an oblique view of an aircraft with ducted rotors, with the ducted rotors configured for the aircraft to operate in a helicopter mode.
Figure 2:
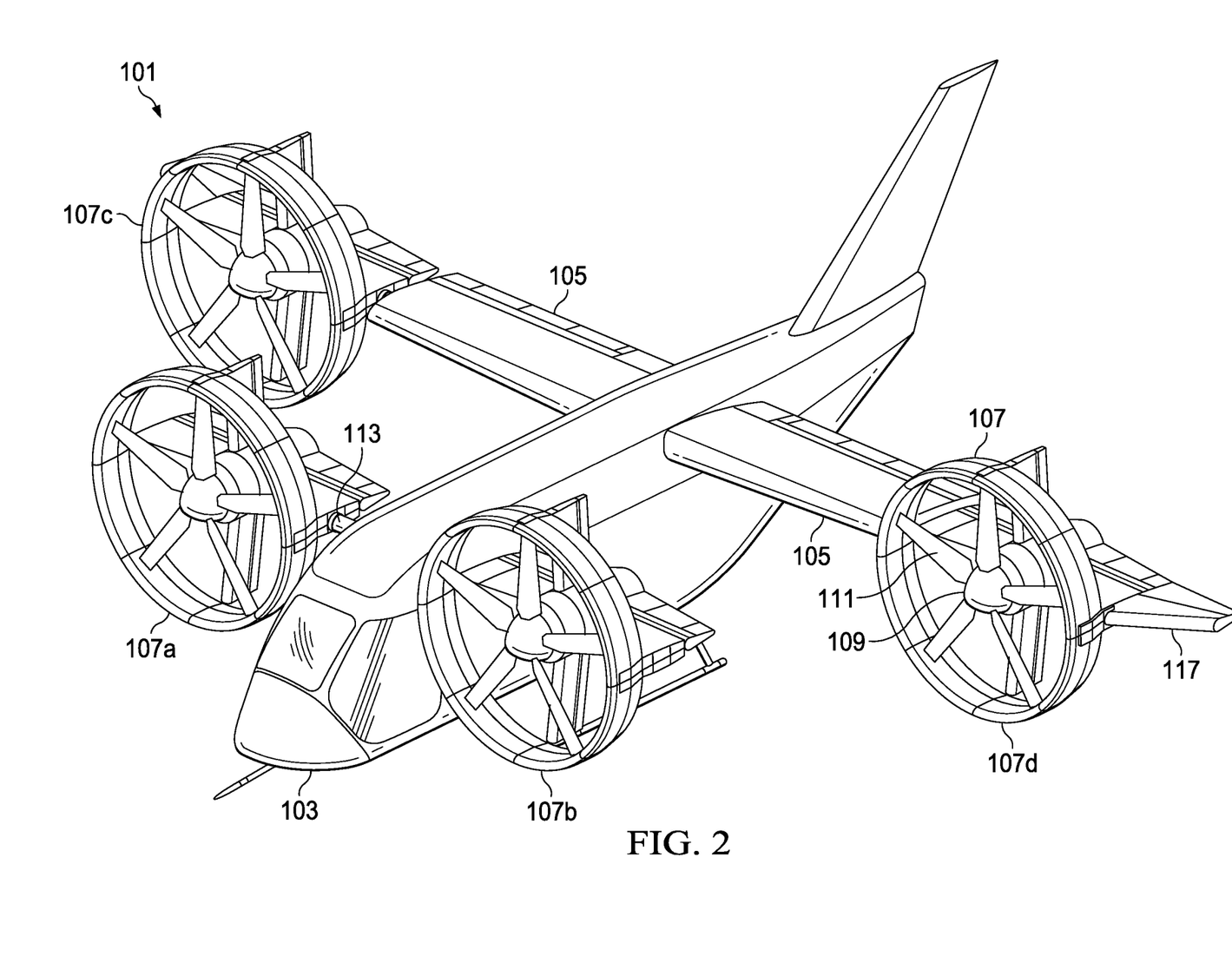
FIG. 2 is an oblique view the aircraft depicted in FIG. 1, with the ducted rotors configured for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

Figure 3:
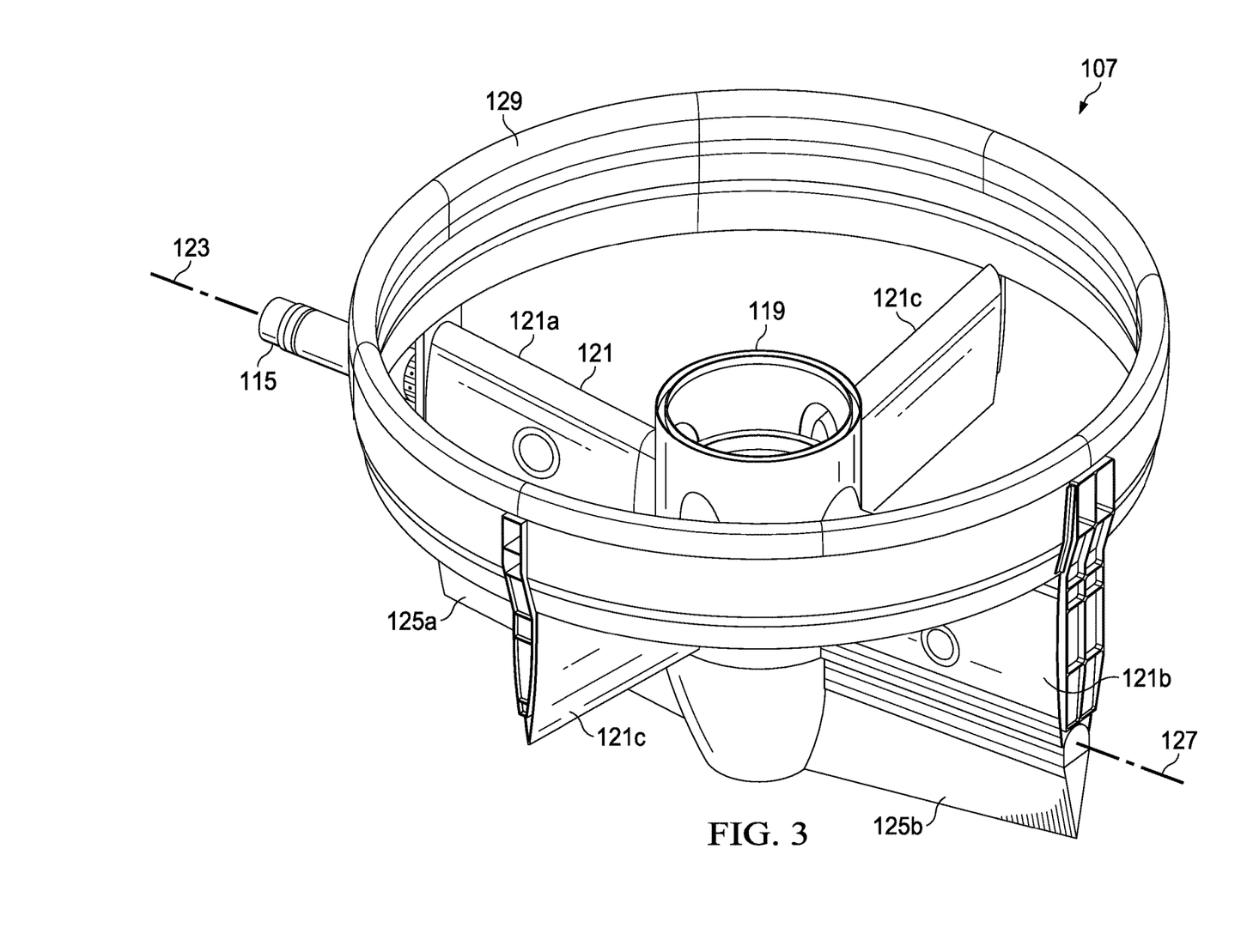
FIG. 3 is an oblique view of a duct of the aircraft depicted in FIG. 1.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 115 (e.g., as seen in FIG. 3). As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

FIG. 3 is an oblique view of a duct 107 of aircraft 101. Duct 107 is depicted in FIG. 3 without rotor 109. Duct 107 includes a central hub 119 that is configured to support and house a rotor 109 and/or other components. Duct 107 further includes a plurality of stators 121 that extend outwardly from the hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125*a* and an outboard control vane 125*b*, which are pivotally attached to inboard primary stator 121*a* and outboard primary stator 121*b*, respectively. Inboard control vane 125*a* and outboard control vane 125*b* are pivotable about a vane axis 127 that extends parallel to spindle axis 123. In this embodiment, inboard control vane 125*a* and outboard control vane 125*b* are configured to rotate together to facilitate yaw control, changes of direction, turning, etc. during flight of aircraft 101. It should be appreciated, however, that inboard control vane 125*a* and outboard control vane 125*b* may alternatively be configured to rotate independently from one another. It should further be appreciated that duct 107 is not limited to the illustrated configuration of inboard control vane 125*a* and outboard control vane 125*b*. For example, duct 107 may alternatively be configured with more or fewer control vanes, such as a single control vane that defines a continuous control surface. Duct 107 may include one or more sections of skin 129 that form an aerodynamic outer covering of duct 107, and that define an opening that extends through duct 107. As shown, hub 119 is located primarily aft of the opening.

Figure 4:
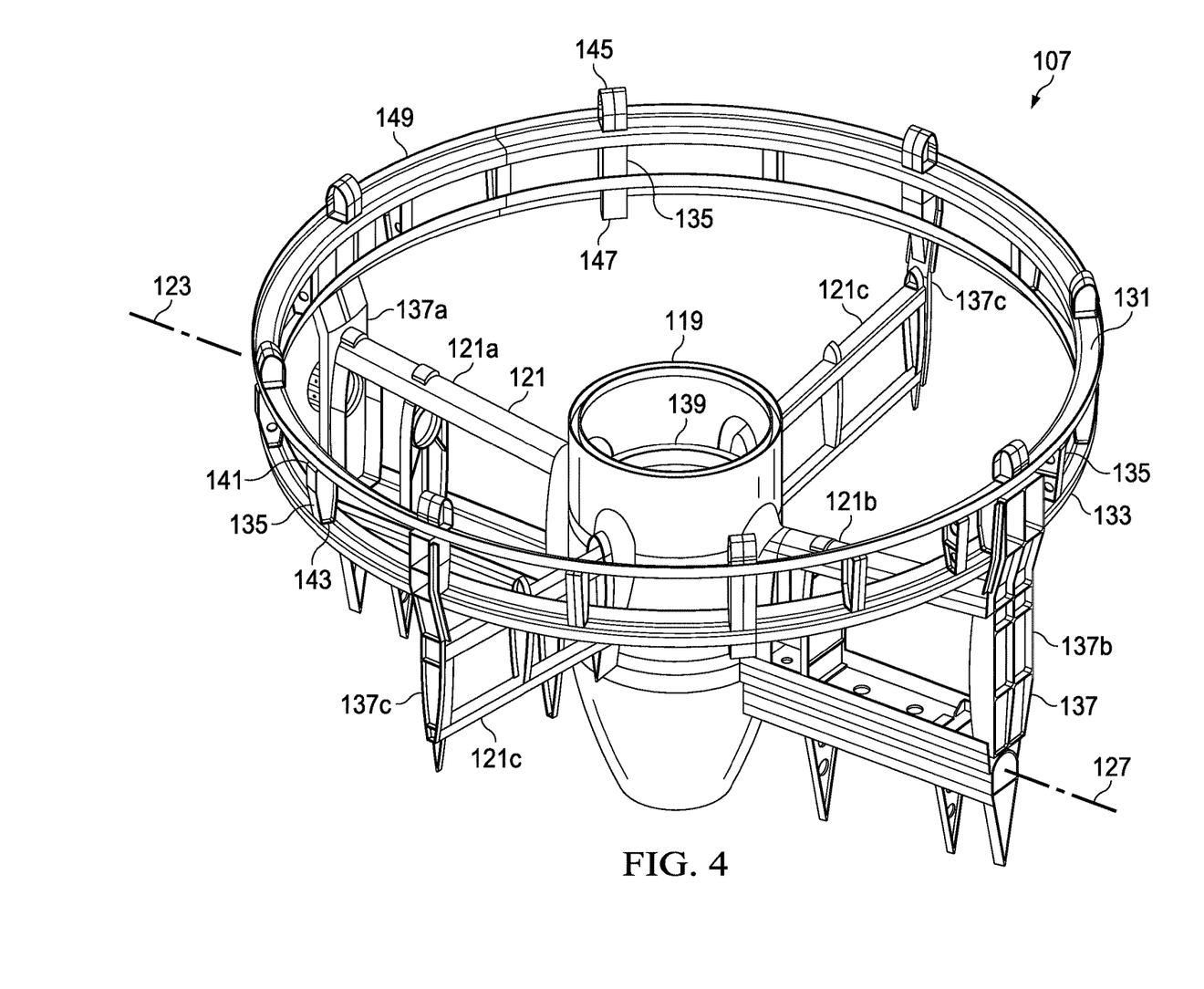
FIG. 4 is an oblique view of the duct depicted in FIG. 3, with an outer skin of the duct removed to illustrate internal components of the duct.

FIG. 4 is an oblique view of duct 107 with aerodynamic exterior skin pieces, including skin 129, removed to illustrate inner components of duct 107. Duct 107 has a structural framework comprised of structural members. Included among structural members of duct 107 are hub 119, stators 121, an annular forward spar 131, an annular aft spar 133, a plurality of ribs 135, a plurality of fittings 137, and an inner hub assembly 139. Hub assembly 139 is configured for the attachment of a motor (not shown) thereto that drives rotor 109, and configured to facilitate the attachment thereto of other components of duct 107, such as stators 121, mechanisms for adjusting rotor pitch of blades 111, and so on.

Each rib 135 defines an upper end 141 and an opposed lower end 143. The upper end 141 of each rib 135 is configured to attach to forward spar 131, and the lower end 143 of each rib 135 is configured to attach to aft spar 133. As shown, ribs 135 may be configured with differing geometries relative to each other. For example, certain ones of ribs 135 may define one or more apertures that extend therethrough. It should be appreciated that duct 107 is not limited to the illustrated configuration of ribs 135. For example, duct 107 may be implemented with more or fewer ribs and/or with ribs having the same or different geometries as compared to ribs 135.

In this embodiment, duct 107 includes four fittings 137. Each fitting 137 is configured to couple to a second end of a corresponding stator 121. More specifically, duct 107 includes an inboard primary stator fitting 137*a* that is couplable to a second end of inboard primary stator 121*a*, an outboard primary stator fitting 137*b* that is couplable to a second end of outboard primary stator 121*b*, and two secondary stator fittings 137*c* that are couplable to respective second ends of secondary stators 121*c*. The opposed first end of each stator 121 is configured to be coupled to hub assembly 139.

In this embodiment, the structural members of duct 107 further include upper braces 145 and lower braces 147. Upper braces 145 are attached to forward spar 131 and are configured to support corresponding portions of skin 129. As shown, duct 107 includes eight upper braces 145 that are equally spaced apart around forward spar 131, attached to forward spar 131 at locations above every fitting 137 and at midpoints between adjacent fittings 137. Lower braces 147 are attached to aft spar 133 and are configured to support corresponding portions of skin 129. As shown, duct 107 includes four lower braces 147 that are spaced apart around aft spar 133, attached below corresponding upper braces 145. As shown, ribs 135 that are disposed between an upper brace 145 and a lower brace 147 may be wider than others of the plurality of ribs 135.

When assembled, as shown in FIG. 4, forward spar 131, aft spar 133, ribs 135, fittings 137, upper braces 145, and lower braces 147 together comprise a first structural portion of duct 107 that defines a duct ring 149 of duct 107. Duct ring 149 further includes one or more sections of skin 129. As shown, duct ring 149 surrounds a portion of hub 119 and defines a passage through which air moves through duct ring 149. Hub 119, stators 121, and control vane 125 together comprise a second structural portion of duct 107 that supports a motor (not shown) and rotor 109.

When ducts 107 of aircraft 101 are positioned as shown in FIG. 2 with blades 111 of rotors 109 rotating, air will move into the duct rings 149 of ducts 107 past forward spars 131 as rotors 109 generate thrust that causes aircraft 101 to move in a forward direction. As air moves through ducts 107 while blades 111 of rotors 109 are rotating, the air will move past aft spars 133 and be exhausted over control vanes 125 and away from ducts 107, for example in an aft direction as aircraft 101 moves in a forward direction. In this regard, control vanes 125 are mounted aft of blades 111 of rotors 109.

One or both of forward spar 131 and aft spar 133 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 131 and aft spar 133 may be constructed from one or more layered plies of carbon-fiber-reinforced plastic (CFRP). It should be appreciated that duct 107 is not limited to an implementation having two spars such as forward spar 131 and aft spar 133. For example, duct 107 may be alternatively implemented with more or fewer spars.

Figure 5A:
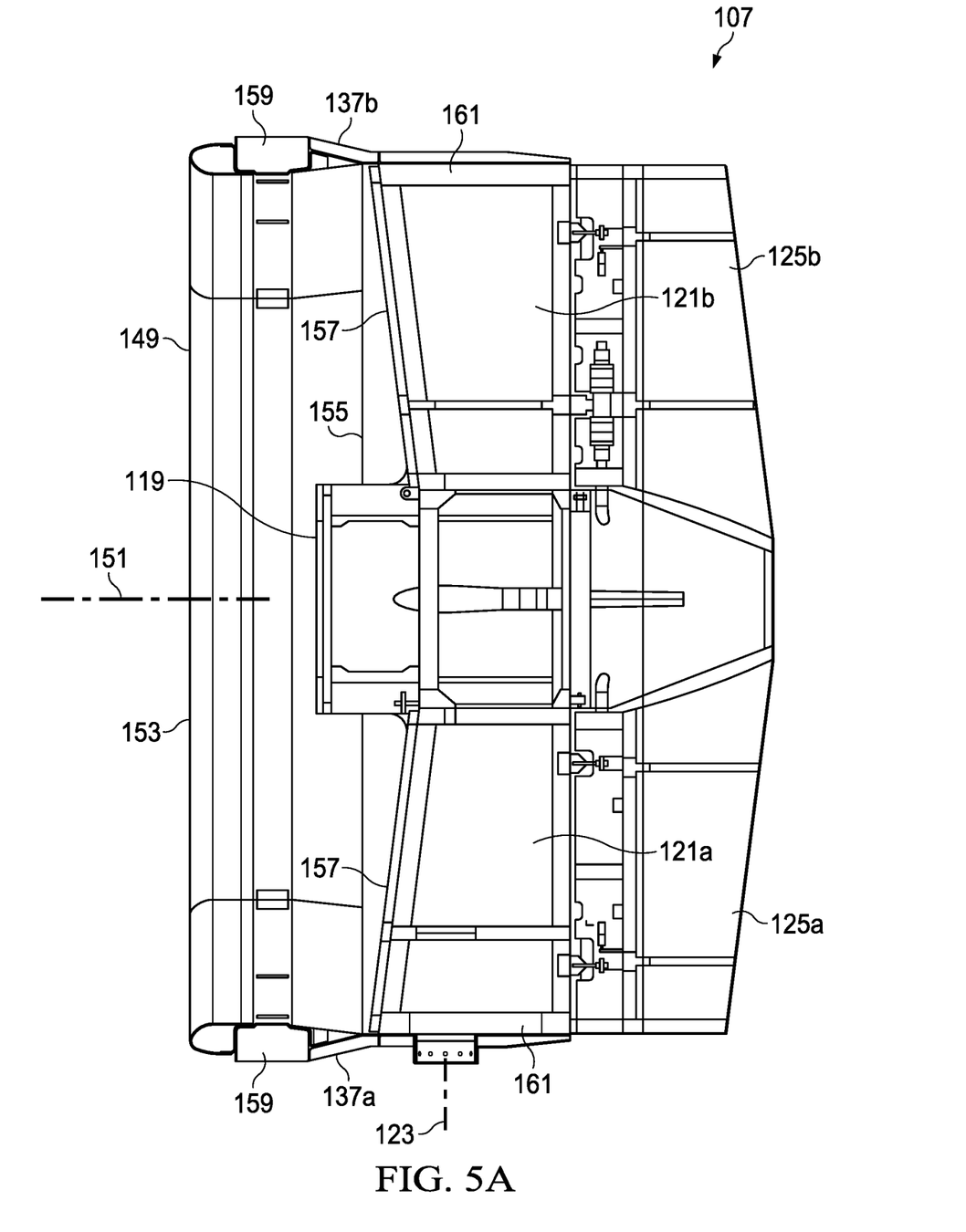
FIG. 5A is a first cross-sectional view of the duct depicted in FIG. 3.
Figure 5B:
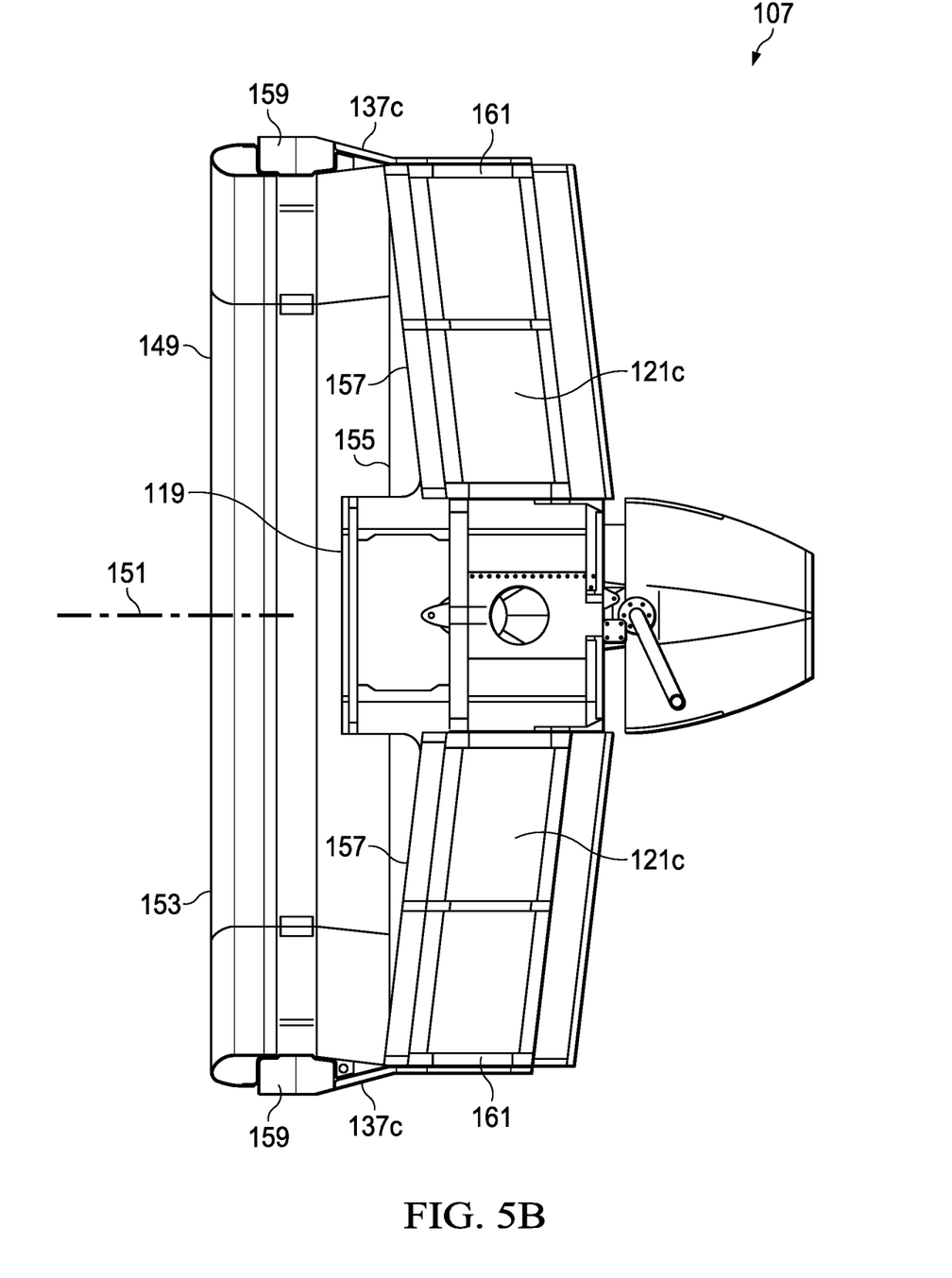
FIG. 5B is a first cross-sectional view of the duct depicted in FIG. 3.

FIG. 5A is a cross-sectional view of duct 107, taken along a plane that extends parallel to a longitudinal midline of inboard primary stator 121*a* and outboard primary stator 121*b* and extends parallel to a central duct axis 151 about which rotor 109 rotates. FIG. 5B is a cross-sectional view of duct 107, taken along a plane that extends parallel to a longitudinal midline of secondary stators 121*c* and extends parallel to central duct axis 151. Duct ring 149 defines a circumferential leading edge 153 and a circumferential trailing edge 155. Each stator 121 defines a leading edge 157. It should be appreciated that leading edges 157 of stators 121 are not limited to the illustrated slanted configuration. For example, leading edges 157 of stators 121 may be alternatively configured with any other suitable geometry.

In this embodiment, duct 107 includes inboard primary stator fitting 137*a*, outboard primary stator fitting 137*b*, and a pair of secondary stator fittings 137*c*. Inboard primary stator fitting 137*a*, outboard primary stator fitting 137*b*, and secondary stator fittings 137*c* may be referred to as a system of fittings for installation in duct 107. Inboard primary stator fitting 137*a* and outboard primary stator fitting 137*b* may be referred to as first and second fittings of the system of fittings and secondary stator fittings 137*c* may be referred to as third and fourth fittings of the system of fittings.

As shown, each fitting 137 includes an attachment interface 159 that is configured to couple to structure of duct ring 149 and an attachment interface 161 that is configured to couple to a corresponding stator 121 of duct 107. For each fitting 137, attachment interface 159 is spaced from attachment interface 161 such that when fitting 137 is coupled to duct ring 149 and a corresponding stator 121, all or substantially all of stator 121 is located aft of trailing edge 155 of duct ring 149. It was observed that locating all or substantially all of stators 121 aft of trailing edge 155 of duct ring 149, thereby increasing a distance between blades 111 of rotor 109 and leading edges 157 of stators 121, decreases noise and increases vibrational stability of ducts 107.

For example, as shown in FIG. 5A, attachment interface 159 of inboard primary stator fitting 137*a* is spaced from attachment interface 161 thereof such that when inboard primary stator fitting 137*a* is coupled to duct ring 149 and inboard primary stator 121*a*, all of inboard primary stator 121*a* is located aft of trailing edge 155 of the duct ring 149. Similarly, attachment interface 159 of outboard primary stator fitting 137*b* is spaced from attachment interface 161 thereof such that when outboard primary stator fitting 137*b* is coupled to duct ring 149 and inboard primary stator 121*a*, all of outboard primary stator 121*b* is located aft of trailing edge 155 of the duct ring 149. Additionally, as shown in FIG. 5B, for each of secondary stator fittings 137*c*, attachment interface 159 is spaced from attachment interface 161 such that when secondary stator fitting 137*c* is coupled to duct ring 149 and a corresponding secondary stator 121*c*, substantially all of secondary stator 121*c* is located aft of trailing edge 155 of the duct ring 149. As shown, when fittings 137 are installed in duct 107, attachment interfaces 161 are located radially inward from attachment interfaces 159, relative to central duct axis 151. It should be appreciated that while the illustrated configurations of fittings 137 cause all or substantially all of each of stators 121 to be located aft of trailing edge 155 of duct ring 149, fittings 137 may be alternatively configured to position one or more stators 121 in other locations relative to duct ring 149.

Figure 6A:
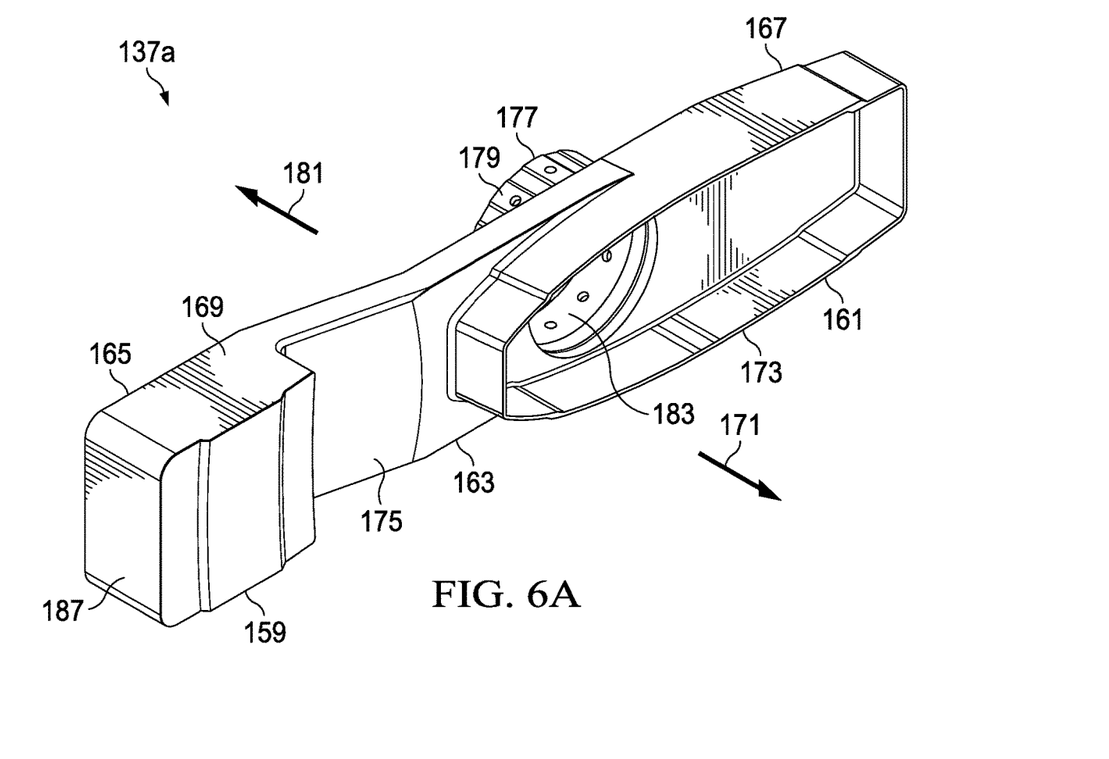
FIG. 6A is a first oblique view of a fitting component of the duct depicted in FIG. 3.
Figure 6B:
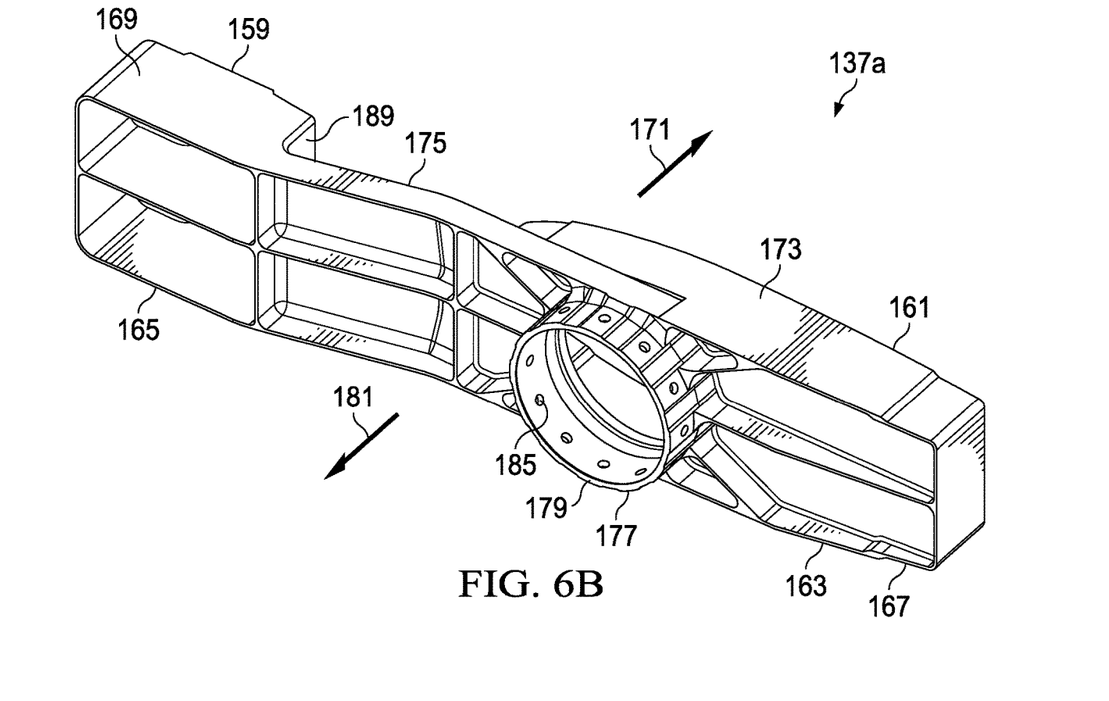
FIG. 6B is a second oblique view of the fitting component depicted in FIG. 6A.

FIGS. 6A and 6B are oblique views of inboard primary stator fitting 137*a*. Inboard primary stator fitting 137*a* is configured to be couplable to a second end of inboard primary stator 121*a*. Inboard primary stator fitting 137*a* includes a body 163 that is elongate between a first end 165 and an opposed second end 167. Body 163 defines attachment interface 159 that is configured to couple to structure of duct ring 149, attachment interface 161 that is configured to couple to a second end of inboard primary stator 121*a* of duct 107. In this embodiment, attachment interface 159 is located at first end 165 of body 163 and attachment interface 161 is located at second end 167 of body 163. As shown, attachment interface 159 comprises a protrusion 169 that extends outward from body 163 along a first direction 171. It should be appreciated that protrusion 169 is not limited to the illustrated geometry, and more generally that attachment interface 159 is not limited to a protrusion. Attachment interface 161 comprises an insert 173 that extends outward from body 163 along first direction 171. As shown, insert 173 in implemented as a flanged insert that is configured to be received in a second end of inboard primary stator fitting 137*a*. It should be appreciated that insert 173 is not limited to a flanged insert or to an insert having the illustrated geometry, and more generally that attachment interface 161 is not limited to an insert.

Body 163 further defines a neck 175 that extends from attachment interface 159 to attachment interface 161. As shown, neck 175 is angled relative to attachment interface 159 and attachment interface 161. In this embodiment, attachment interface 159 is spaced apart from attachment interface 161 by neck 175.

Body 163 of inboard primary stator fitting 137*a* further defines an attachment interface 177 that is configured to at least partially receive a spindle of aircraft 101, such as spindle 113 or 115. As shown, attachment interface 177 comprises a tubular collar 179 that extends outward from body 163 along a second direction 181 that is opposite first direction 171. Collar 179 defines an aperture 183 that extends through body 163. As shown, aperture 183 opens to an interior of insert 173. Aperture 183 is configured to receive a portion of spindle 113 or 115. It follows that collar 179 is configured to receive a portion of spindle 113 or 115. Collar 179 may be configured to be mechanically fastened to spindle 113 and/or 115. For example, in this embodiment collar 179 has a plurality of apertures 185 that extend therethrough. Apertures 185 may be aligned with a complementary plurality of apertures of spindle 113 or 115 such that fasteners, for instance bolts, may be installed into the pluralities of apertures to removably secure duct 107 to spindle 113 and/or 115. It should be appreciated that collar 179 is not limited to the illustrated geometry, and more generally that attachment interface 177 is not limited to a collar.

Figure 7:
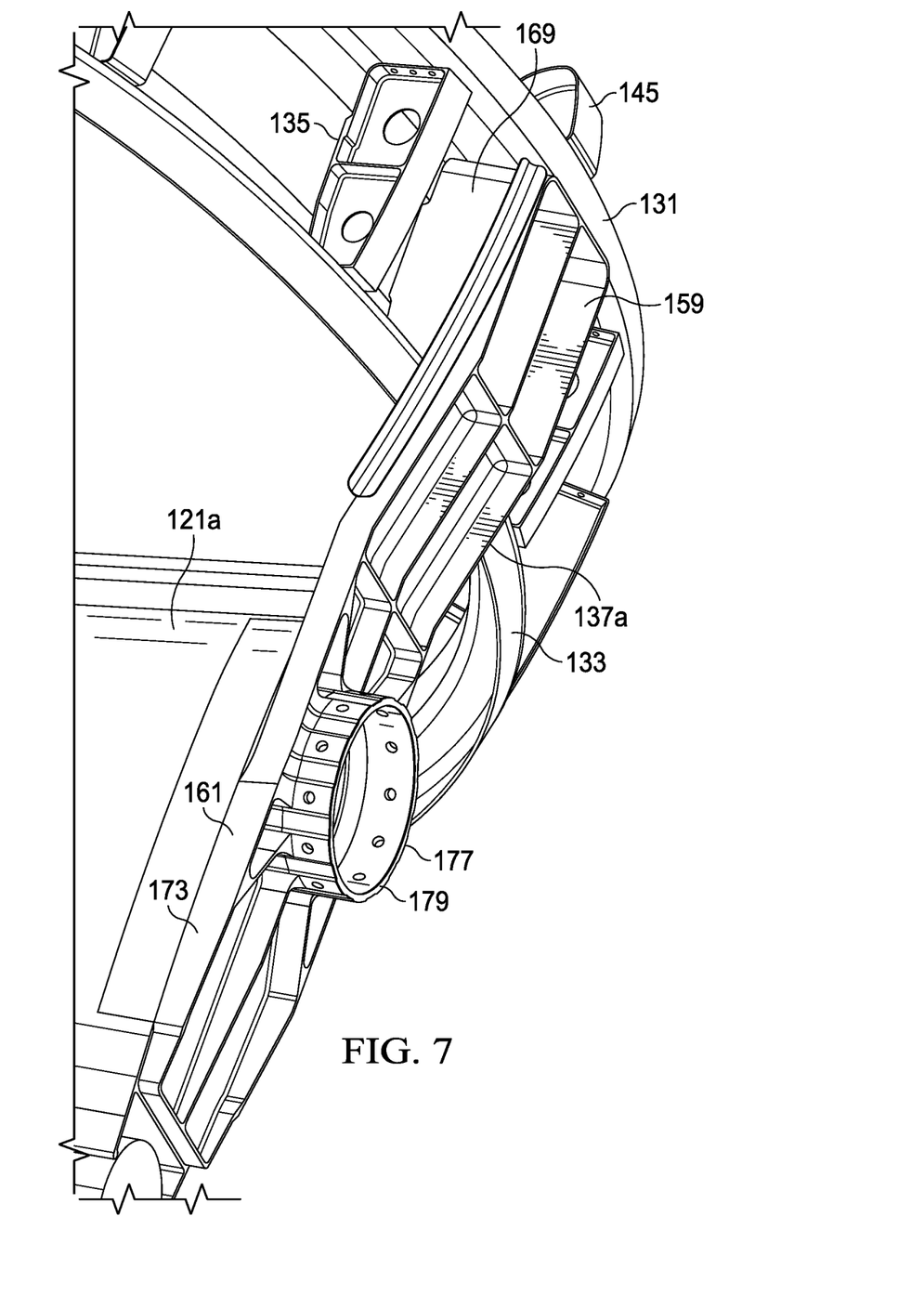
FIG. 7 is an oblique view of a portion of the duct depicted in FIG. 3, illustrating the fitting depicted in FIGS. 6A and 6B in an installed position in the duct.
Figure 8:
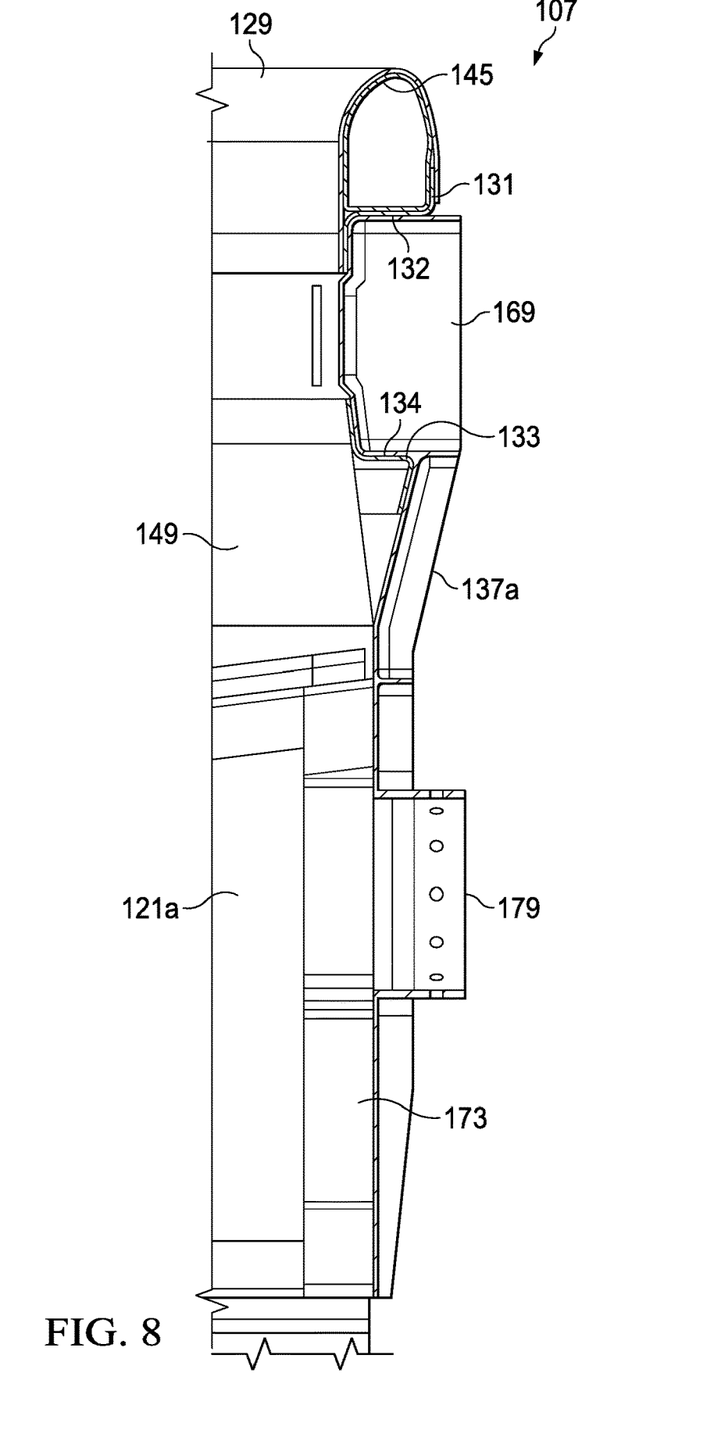
FIG. 8 is a cross-sectional view of the fitting depicted in FIGS. 6A and 6B, with the fitting in the installed position illustrated in FIG. 7.

FIG. 7 is an oblique view of a portion of duct 107, illustrating inboard primary stator fitting 137*a* in an installed position in duct 107. FIG. 8 is a cross-sectional oblique view of inboard primary stator fitting 137*a* installed in duct 107. In this embodiment, protrusion 169 is configured to be coupled to duct ring 149. More specifically, protrusion 169 defines a first surface 187 (as shown in FIG. 6A) that is configured to abut a lower surface 132 of forward spar 131 when protrusion 169 is disposed between forward spar 131 and aft spar 133 and a second surface 189 (as shown in FIG. 6B) that is configured to abut an upper surface 134 of aft spar 133 when protrusion 169 is disposed between forward spar 131 and aft spar 133. Inboard primary stator fitting 137*a* may be installed in duct ring 149, and thus in duct 107, by disposing protrusion 169 between forward spar 131 and aft spar 133 and securing one or both of forward spar 131 and aft spar 133 to protrusion 169, for example using fasteners.

Figure 9:
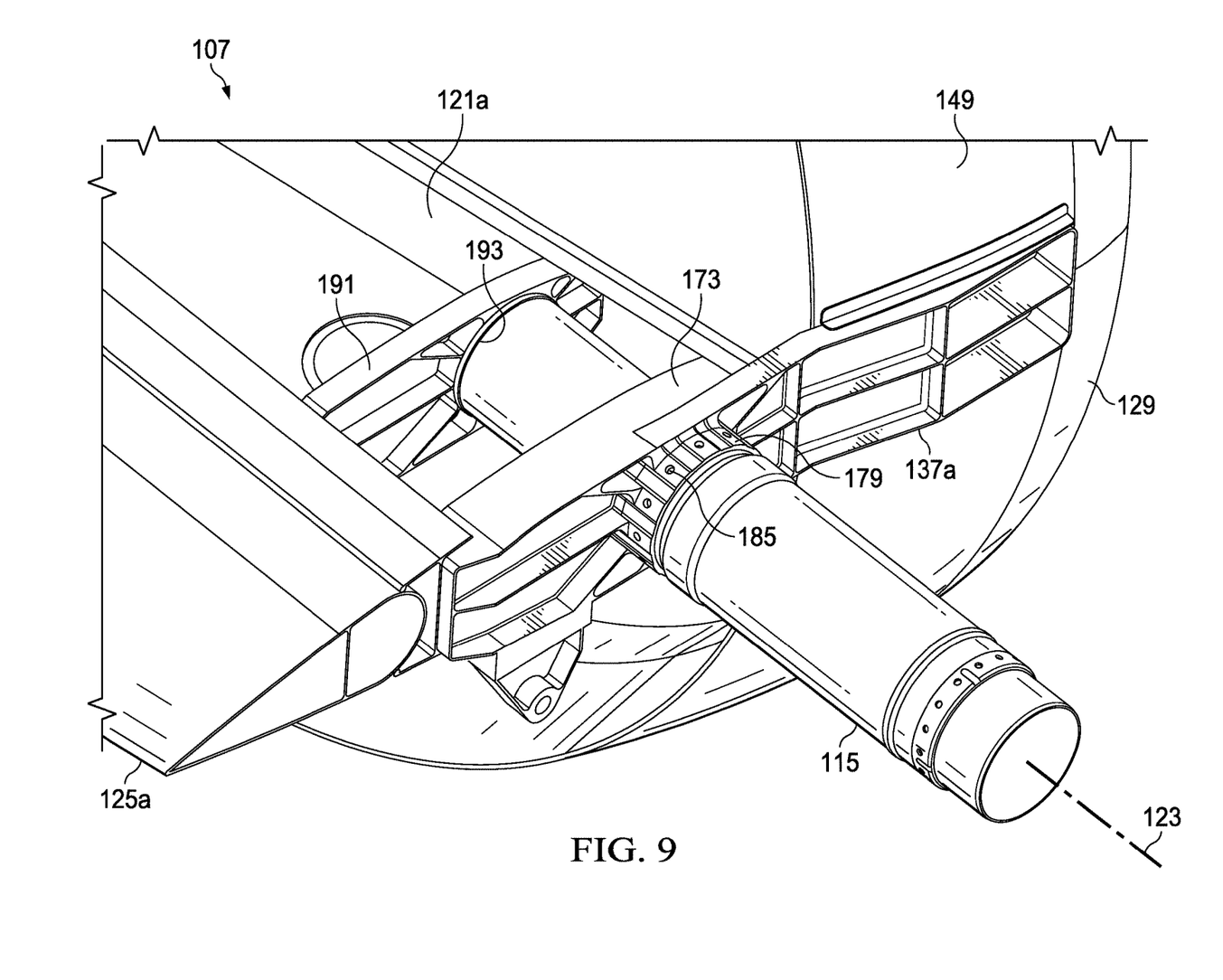
FIG. 9 is an oblique view of the fitting depicted in FIGS. 6A and 6B, with the fitting in the installed position illustrated in FIG. 7 and a spindle component attached to the fitting.

FIG. 9 is an oblique view of a portion of duct 107, with spindle 115 coupled to inboard primary stator 121*a*. As shown, insert 173 of inboard primary stator fitting 137*a* is disposed into a second end of inboard primary stator 121*a* and secured to inboard primary stator 121*a*, for example using fasteners. With inboard primary stator fitting 137*a* coupled to the second end of inboard primary stator 121*a*, inboard primary stator 121*a* is configured to be couplable to a spindle, such as spindle 115 (as shown) or spindle 113.

Inboard primary stator 121*a* may include one or more structural members, in addition to inboard primary stator fitting 137*a*, that may be configured to facilitate coupling a spindle, such as spindle 113 or spindle 115, to inboard primary stator 121*a*, and thus to duct 107. For example, in this embodiment, inboard primary stator 121*a* includes a rib 191 that is spaced inward from inboard primary stator fitting 137*a*. In this regard, rib 191 is to central duct axis 151 than is inboard primary stator fitting 137*a*. Rib 191 defines an aperture 193 that extends therethrough and that aligns with aperture 183 when inboard primary stator fitting 137*a* is coupled to inboard primary stator 121*a*. Aperture 193 is configured to receive an end of a spindle, such as spindle 113 or spindle 115. It should be appreciated that inboard primary stator 121*a* is not limited to inboard primary stator fitting 137*a* and rib 191 to facilitate coupling a spindle to inboard primary stator 121*a*. For example, inboard primary stator 121*a* may be alternatively configured with one or more other structural members, in addition to or in lieu of one or both of inboard primary stator fitting 137a and rib 191, to facilitate coupling a spindle to inboard primary stator 121a.

Coupling duct 107 to a spindle that is coupled to fuselage 103 of aircraft 101, such as spindle 113 or spindle 115, establishes a primary load path from duct 107 to fuselage 103 via inboard primary stator 121a and the spindle. In this embodiment, coupling a spindle, such as spindle 113 or 115, to inboard primary stator 121a comprises disposing an end of the spindle into collar 179, and thus into aperture 183, of inboard primary stator fitting 137a and translating the spindle until the end thereof is received in aperture 193 of rib 191. When in an inserted position within apertures 183 and 193, the spindle may be secured to inboard primary stator 121a via fasteners, such as bolts, installed into apertures 185 of collar 179.

In this embodiment, outboard primary stator fitting 137b is configured similarly to inboard primary stator fitting 137a, omitting attachment interface 177. Additionally, secondary stator fittings 137c are configured similarly to outboard primary stator fitting 137b but have respective bodies that are narrower than that of outboard primary stator fitting 137b. Outboard primary stator fitting 137b and secondary stator fittings 137c define respective attachment interfaces (not shown) that are similar to attachment interfaces 159 and 161 of inboard primary stator fitting 137a.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A duct structure for a duct of a ducted-rotor aircraft, the aircraft having a fuselage, the duct including a rotor having a plurality of blades, the duct structure comprising:
   a hub that is configured to support the rotor;
   a plurality of stators that are coupled to the hub; and
   a duct ring that is coupled to the plurality of stators,
   wherein a first stator of the plurality of stators is configured to be couplable to a spindle that is rotatably coupled to the fuselage; and
   wherein the first stator is configured to selectively receive the spindle further radially inward relative to a most radially inward portion of the duct ring.

2. The duct structure of claim 1, further comprising:
   a fitting that is coupled to the first stator, the fitting defining a first attachment interface that is configured to receive a portion of the spindle.

3. The duct structure of claim 2, wherein the first attachment interface comprises a tubular collar that defines a first aperture that extends through the fitting, the collar configured to receive a portion of the spindle.

4. The duct structure of claim 3, wherein the first stator comprises a rib that is spaced inward from the fitting, the rib defining a second aperture that extends therethrough, the second aperture aligned with the first aperture and configured to receive an end of the spindle.

5. The duct structure of claim 2, wherein the fitting further defines a second attachment interface that couples to structure of the duct ring and a third attachment interface that couples the fitting to an end of the first stator.

6. The duct structure of claim 5, wherein the structure of the duct ring comprises first and second annular spars and the second attachment interface comprises a protrusion that is configured to be coupled between the first and second spars, and
   wherein the third attachment interface comprises an insert that is configured to be received in the end of the first stator.

7. The duct structure of claim 1, wherein the plurality of stators extend radially outward from the hub.

8. A ducted-rotor aircraft comprising:
   a fuselage;
   a duct having a duct structure that comprises:
      a hub that is configured to support a rotor;
      a plurality of stators that are coupled to the hub; and
      a duct ring that is coupled to the plurality of stators; and
   a spindle that is coupled to a first stator of the plurality of stators, the spindle rotatably coupled to the fuselage;
   wherein the first stator receives the spindle further radially inward relative to a most radially inward portion of the duct ring.

9. The ducted-rotor aircraft of claim 8, wherein the duct further comprises:
   a fitting that is coupled to the first stator, the fitting defining a first attachment interface that is configured to receive a portion of the spindle.

10. The ducted-rotor aircraft of claim 9, wherein the first attachment interface comprises a tubular collar that defines a first aperture that extends through the fitting, the collar configured to receive a portion of the spindle.

11. The ducted-rotor aircraft of claim 10, wherein the first stator comprises a rib that is spaced inward from the fitting, the rib defining a second aperture that extends therethrough, the second aperture aligned with the first aperture and configured to receive an end of the spindle.

12. The ducted-rotor aircraft of claim 9, wherein the fitting further defines a second attachment interface that couples to structure of the duct ring and a third attachment interface that couples the fitting to an end of the first stator.

13. The ducted-rotor aircraft of claim 12, wherein the structure of the duct ring comprises first and second annular spars and the second attachment interface comprises a protrusion that is configured to be coupled between the first and second spars, and
wherein the third attachment interface comprises an insert that is configured to be received in the end of the first stator.

14. The ducted-rotor aircraft of claim 8, wherein the plurality of stators extend radially outward from the hub.

15. A method of establishing a primary load path from a duct of a ducted-rotor aircraft to a fuselage of the aircraft, the method comprising:
providing a duct ring;
providing a hub that is configured to support a rotor having a plurality of blades;
providing a plurality of stators;
coupling the plurality of stators to the hub;
coupling the duct ring to the plurality of stators; and
coupling a spindle that is rotatably coupled to the fuselage to a first stator of the plurality of stators; and
locating the spindle further radially inward relative to a most radially inward portion of the duct ring.

16. The method of claim 15, further comprising:
providing a fitting that is coupled to the first stator, the fitting defining a first attachment interface that is configured to receive a portion of the spindle.

17. The method of claim 16, wherein the first attachment interface comprises a tubular collar that defines a first aperture that extends through the fitting, the collar configured to receive a portion of the spindle.

18. The method of claim 17, wherein the first stator comprises a rib that is spaced inward from the fitting, the rib defining a second aperture that extends therethrough, the second aperture aligned with the first aperture and configured to receive an end of the spindle.

19. The method of claim 18, wherein coupling the spindle to the first stator comprises disposing an end of the spindle into the first aperture of the fitting;
inserting the end of the spindle into the second aperture of the rib; and
securing the collar of the fitting to the spindle.

20. The method of claim 16, wherein the fitting further defines a second attachment interface that couples to structure of the duct ring, and
wherein coupling the duct ring to the plurality of stators comprises coupling the second attachment interface to the structure of the duct ring.

* * * * *